United States Patent [19]
Brosig

[11] Patent Number: 5,172,187
[45] Date of Patent: Dec. 15, 1992

[54] METHOD OF DETERMINING THE PRETILT ANGLE OF LIQUID CRYSTAL MOLECULES

[75] Inventor: Stefan Brosig, Stuttgart, Fed. Rep. of Germany

[73] Assignee: Nokia Unterhaltungselektronik GmbH, Fed. Rep. of Germany

[21] Appl. No.: 681,154

[22] Filed: Apr. 5, 1991

[30] Foreign Application Priority Data

Apr. 6, 1990 [DE] Fed. Rep. of Germany ....... 4011116

[51] Int. Cl.$^5$ ............................................. G01N 21/21
[52] U.S. Cl. .................................... 356/364; 356/322; 356/436; 356/327; 359/91; 359/93; 359/96
[58] Field of Search ............... 356/364, 322, 327, 436, 356/441; 350/337, 340, 341; 359/90-99, 102

[56] References Cited

U.S. PATENT DOCUMENTS

| | | | |
|---|---|---|---|
| 4,799,774 | 1/1989 | Bauer et al. | 350/346 |
| 4,974,941 | 12/1990 | Gibbons et al. | 359/96 |
| 5,071,228 | 12/1991 | Waldmann et al. | 359/63 |

FOREIGN PATENT DOCUMENTS

| | | |
|---|---|---|
| 2158563 | 10/1975 | Fed. Rep. of Germany . |
| 3248070 | 6/1984 | Fed. Rep. of Germany . |
| 3609141 | 9/1987 | Fed. Rep. of Germany . |
| 3843767 | 7/1990 | Fed. Rep. of Germany . |
| 1372868 | 11/1974 | United Kingdom . |
| 2134253 | 8/1984 | United Kingdom . |

OTHER PUBLICATIONS

Mosley, A.; et. al.: Surface alignment of liquid crystals by rubbed polymer layers in: Displays, Jan. 1987, pp. 17–19.

Urisi, Tsuneo; et. al.: Orientation control of dye molecules in a liquid crystal in: Applied Optics; vol. 17, No. 15, Aug. 1, 1978; pp. 2366–2368.

Hiroshima, K.; Obi, H.: Controlled Low-Tilt-Angle Liquid-Crystal Orientation on "Omniazimuthally" Evaporated SiO Films at 60 degr. Incidence in: Proceedings of the SID, vol. 25/4, 1984, pp. 287–292.

Journal of Applied Physics, vol. 60, No. 8, Oct. 1986, New York US pp. 2820–2822; K. H. Yang et al: 'A simple method to determine the pretilt angle of nematic guest–host liquid crystals' *the whole document* idem.

Patent Abstracts of Japan vol. 6, No. 51 (P-108) Apr. 1982 & JP-A-56 164 318 (Matsushita Electric Co) Dec. 17, 1981 *abstract*.

Patent Abstracts of Japan vol. 13, No. 430 (P-937) Sep. 26, 1989 & JP-A-162 134 (Fujitsu Ltd) Jun. 26, 1989 *abstract*.

Patent Abstracts of Japan vol. 9, No. 199 (P-380), Aug. 16, 1985 & JP-A-60 064 241 (Nippon Denso KK) Apr. 12, 1985 *abstract*.

Japanese Journal of Applied Physics, Letters vol. 21, No. 5, May 1982 Tokyo JP pp. 266–268; R. Akiyama et al: 'Determination of Tilt Bias Angles to Nematic Liquid Crystal Cells . . . ' *abstract*.

Japanese Journal of Applied Physics, vol. 19, No. 10, 1980, Tokyo JP pp. 2013–2014; F. Nakano et al.: 'Simple Method of Determining Liquid Crystal Tilt-Bias Angle' *the whole document*.

(List continued on next page.)

Primary Examiner—Samuel A. Turner
Assistant Examiner—La Charles P. Keesee
Attorney, Agent, or Firm—Ware, Fressola, Van Der Sluys & Adolphson

[57] ABSTRACT

The invention concerns a method of determining the angle of attack (pretilt angle) of liquid crystal molecules in a liquid crystal display (LCD) provided with top and bottom cover plates. The following steps are proposed for a simple and cheap determination: addition of a dichroic dye (17) to the liquid crystal (5) in order to cause the dye molecules (18) to become aligned by the crystal molecules (6), which are present in a twist-free state, determination by measurement of a maximum absorption value, the said measurement being carried out by causing a polarized ray of light (19) (measuring ray) to pass through the liquid crystal display (1) and varying its angle of inclination ($\alpha$) with respect to the plane of the cover plates (2,3), and then using the angle of inclination ($\alpha$) associated with the maximum absorption for determining the angle of attack ($\delta$).

20 Claims, 5 Drawing Sheets

OTHER PUBLICATIONS

Applied Physics Letters, vol. 33, No. 7, Oct. 1978, New York US, pp. 561-563; K. Suzuki et al.: 'A method of measuring the low tilt bias of liquid crystals' *abstract*.

Journal of Applied Physics, vol. 48, No. 5, May 1977, New York US, pp. 1783-1792; T. J. Scheffer et al.: 'Accurate determination of liquid-crystal tilt angles' *abstract*.

Physics Letters, A, vol. 56, No. 2, Mar. 1976, Amsterdam NL pp. 142-144; G. Bauer et al.: 'Determination of the tilt angles at surfaces of substrates in liquid crystal cells' *abstract*.

$I_2 < I_3 < I_1$

METHOD OF DETERMINING THE PRETILT ANGLE OF LIQUID CRYSTAL MOLECULES

BACKGROUND OF THE INVENTION

1. Field of the Invention

The present invention concerns a method of determining the pretilt angle of the liquid crystal molecules of a liquid crystal display (LCD) provided with top and bottom cover plates.

2. Description of the Prior Art

Liquid crystal displays are being used on an increasing scale in many fields of technology. They are provided with top and bottom cover plates, the liquid crystal being contained between these plates. Each cover plate consists of several different layers, for example, a polarization filter layer, a glass plate, an electrode layer, and an orientation layer. The latter layer is subjected to a special treatment during manufacture in order to enable it to impress a particular alignment or orientation upon the liquid crystal molecules. The orientation layer consists preferably of organic polymers (polyimides, polyphenyls) and, during the manufacturing process, it is "rubbed", especially with a roller, in order to confer upon it the property of orienting the liquid crystal molecules. According to the particular rubbing direction, it is possible to produce liquid crystal molecule patterns with different helix structures. The term "helix structure" is to be understood as referring to the twist of the liquid crystal molecules that constitute a row between the cover plates of the liquid crystal cell. The liquid crystal molecules are essentially rod-shaped and their longitudinal alignment is more or less parallel to the planes of the cover plates. Inasmuch as these molecules have an angle of incidence (also known as angle of attack or pretilt angle) with respect to the cover plate plane, they do however deviate from this basic parallelity. The said pretilt angle stabilizes the helix and is therefore a desirable feature. In a socalled TN cell the twist angle amounts to 90°. However, such a cell has the disadvantage that the display can be clearly recognized only within a relatively narrow viewing angle Liquid crystal displays with twist angles of 220° are described as "supertwisted nematic" (STN) and can be read over a considerably larger viewing angle. Socalled EVA (extended viewing angle) displays are even further improved as far as the viewing angle is concerned. They have a twist angle of 270°.

The above remarks make it clear that either during the manufacture or the use of a liquid crystal display (LCD) it may become necessary to determine the angle of attack (pretilt angle) of the liquid crystal molecules. Various methods to this end are known in the state of the art. In one known laser method the pretilt angle is determined by means of an interference measurement. A method based on the Frederickz effect is also known and determines the angle of incidence with the help of a magnetic field. Both known methods have the drawback that very complicated equipment is needed to carry them out, so that they both involve considerable cost.

SUMMARY OF THE INVENTION

The present invention is therefore underlain by the problem of specifying a method of determining the pretilt angle of the liquid crystal molecules of a liquid crystal display that can be carried out simply and at small cost. An uncomplicated measurement of the pretilt angle must therefore be made possible.

According to the present invention this problem can be solved by a procedure involving the following steps: addition of a dichroic dye to the liquid crystal, whence the dye molecules become aligned by the liquid crystal molecules, which are present in a twist-free state, until they are parallel to the latter; determination of the extreme values of an absorption measurement, wherein a ray of light used for measuring purposes passes through the liquid crystal display at a variable angle of inclination with respect to the plane of the cover plates, the angle of inclination associated with the extreme value being subsequently used to determine the pretilt angle. By adding the dichroic dye to the liquid crystal cell, the light passing through the display will become absorbed in a manner that is independent of direction, because the dye molecules become aligned in keeping with the orientation of the liquid crystal molecules. The liquid crystal molecules, in turn, receive their preferred direction from the orientation layers of the cover plates of the liquid crystal display. The orientation layers are aligned in such a way as to cause the dye molecules to assume a twist-free state. Their twist angle will therefore amount to 0°. To this extent, therefore, even the "attached" dye molecules no longer have a helix structure. The liquid crystal display doped with dye is subjected to an absorption measurement, that is to say, it is arranged in the path of a polarized ray of light in a manner where it can he swivelled in such a way as to make it possible to vary the angle of inclination between the measuring ray and the plane of the cover plates. The liquid crystal display is now swivelled until an extreme value is obtained, especially until the absorption attains a maximum. The angle of inclination at which this occurs constitutes a parameter for the determination of the angle of attack of the liquid crystal molecules, so that—after taking due account of the refraction at the boundary surfaces (air-cover plate, cover plate-liquid crystal)—the angle of attack can be calculated in a simple manner. The polarizer used for polarizing the measuring ray can be placed in front of the liquid crystal display, but also behind it, in a position perpendicular to the measuring ray, so that the polarization direction lies at a right angle to the axis of rotation. This description makes it clear that no costly equipment s required and that the method can be carried out in a very simple manner.

The twist-free state of the liquid crystal molecules is caused by the antiparallel action of the orientation of the two cover plates, especially the orientation layers of the cover plates. This condition is preferably produced by rubbing the orientation layers of the cover plates in an antiparallel direction, thus ensuring their antiparallel orientation.

As already mentioned, the extreme value can be ascertained by determining the maximum absorption of the liquid crystal doped with dye. The maximum absorption occurs when the amount of light passing through the liquid crystal display becomes minimized. This state is attained when the measuring ray strikes the dye molecules as aligned by the liquid crystal molecules at exactly a right angle. During the absorption measurement, therefore, the liquid crystal display is rotated until this condition is satisfied.

When an absorption spectrometer is used, the absorption can be determined in a particularly simple manner.

The method that has just been described could be associated with inaccuracies in the determination of the pretilt angle as a result of disturbing influences. These disturbing influences consist, among others, of the fact that the path of the measuring ray within the liquid crystal display will change as a function of the angle of inclination and this, in turn, affects the absorption. This error source can be eliminated by a further development of the invention, which provides for the absorption measurement of the liquid crystal display to be accompanied by the simultaneous and parallel determination of the absorption of a reference cell, where the reference cell has exactly the same structure but is filled with an isotropic dye solution having the same index of refraction as the dye-doped liquid crystal molecule and is penetrated by the reference ray of light at the same angle of inclination as the liquid crystal cell in question. We thus have two light-ray paths, namely the path of the measuring ray which passes through the liquid crystal cell and the path of the reference ray that passes through the reference cell. Since both cells (i.e liquid crystal display and reference cell) have the same structure and also have the same angle of inclination with respect to the ray of light passing through them, the previously described error deriving from the lengthening of the path as a function of the angle of inclination will occur in both the cells. If one now determines only the relative absorption change between the liquid crystal display and the reference cell, the said "light-path error" will be wholly eliminated. Since the identical structure also ensures that the same reflections will occur in the two cells, it follows that, reflection, once again, will not affect the outcome of the measurement. Further, since the reference cell contains an isotropic dye solution, i.e. possesses absorption properties that are independent of direction and therefore remain the same no matter what the direction, the extreme value can be determined wholly without errors deriving from changing parameters, since such parameter changes will occur in the same way in the liquid crystal cell and the reference cell and will therefore cancel each other. The absorption measurement results of the reference cell therefore constitute reference values for the determination of the maximum absorption.

More particularly, the procedure visualizes the same dye being used in the liquid crystal cell and the reference cell. However, inasmuch as the measurement is thus carried out only at a single wavelength, different dyes could also be used as alternatives in the reference cell.

When the absorption measurements are commenced, it is preferable for the measuring ray and the reference ray to strike the cover plates of, respectively, the liquid crystal cell and the reference cell at a right angle and for the dye concentration in the reference cell to be set in such a manner that the absorptions in the two ray paths will be identical. The absorption of the reference cell can be set by adding appropriate quantities of dye to the solution.

Alternatively, however, it is also possible to use a reference cell containing liquid crystal without any dye, so that different conditions are created as regards the angle of refraction that is produced in each of the two cells. These lead to correspondingly different light paths within the liquid crystal cell and the reference cell. These differences must then be taken into account when calculating the pretilt angle.

Since it must be ensured that the angle of inclination of each cell with respect to its light ray (i.e. respectively, measuring ray and reference ray) will always be exactly identical, each of the two cells is fixed to an appropriate rotary table or similar device, the said rotary tables being mechanically coupled to each other in order produce the required identical inclination. In the simplest case this can be done by means of a connecting rod excentrically attached to the two rotary tables. If one of the rotary tables is moved, the connecting rod will carry the other into the same angular position.

DESCRIPTION OF THE DRAWINGS

The invention will now be discussed in greater detail by reference to the appended figures, which can be briefly described as follows.

DETAILED DESCRIPTION OF THE INVENTION

Figure 1:
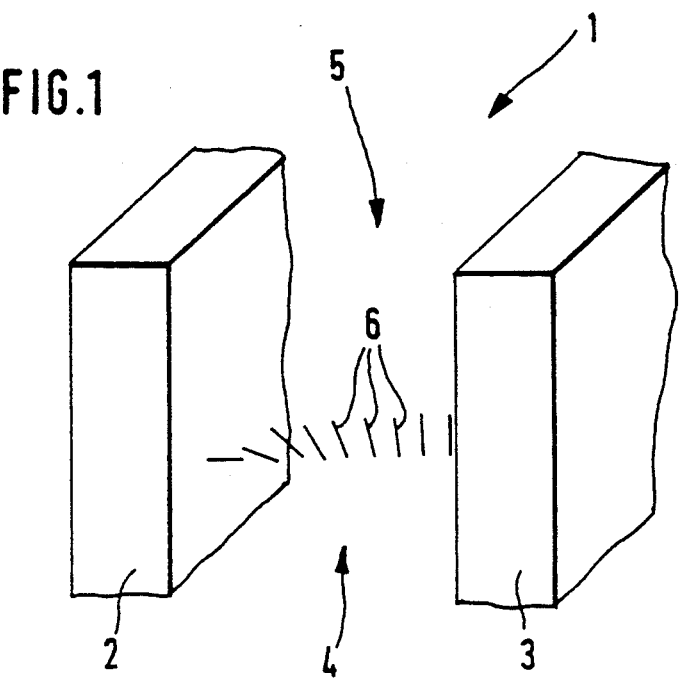
FIG. 1 shows a schematic representation of the arrangement of the liquid crystal molecules in a non-controlled liquid crystal display

FIG. 1 shows a schematic representation of a part of a liquid crystal display 1. At the top and the bottom of the said cell there are the respective cover plates 2 and 3. The space 4 between the cover plates 2 and 3 is filled with a liquid crystal 5, of which only a few molecules 6 are actually shown in FIG. 1. The liquid crystal molecules 6 are essentially rod-shaped particles. As far as their longitudinal alignment is concerned, they run more or less parallel to the planes of the cover plates 2 and 3.

When the liquid crystal display 1 is in an uncontrolled state, the individual liquid crystal molecules 6 will assume parallel positions at some distance from each other, though the arrangement involves a certain internal rotation. In other words, each liquid crystal molecule 6 is displaced through a certain angular amount as compared with its neighbouring liquid crystal molecule 6. The helix formed in this manner is also known as twist. This term is to be understood as referring to the total twist angle between the first and the last liquid crystal molecule 6 in such a helix arrangement.

There are liquid crystal displays 1 with a twist angle of 90° (TN displays). However, since such displays can be clearly read only within a relatively small viewing angle, it is desirable to have larger twist angles. Displays of the type known as "supertwisted nematic" (STN) have a twist angle of about 220° and over. The viewing angle for a clearly legible presentation is much greater in this case. The socalled EVA (extended viewing angle) displays, which have a twist angle of 270°, are distinguished by particularly good reproduction properties as far as the viewing angle is concerned.

In the case of TN cells, the said helix structure of the liquid crystal molecules has the property that the electric field vector of light penetrating into the liquid crystal display will be rotated in accordance with the twist angle, so that the polarization filters provided in the cover plates will ensure that there is no display, because the liquid crystal cell becomes impenetrable to light (if the polarization layers on the top and bottom cover plate are oriented parallel to each other).

Figure 2:
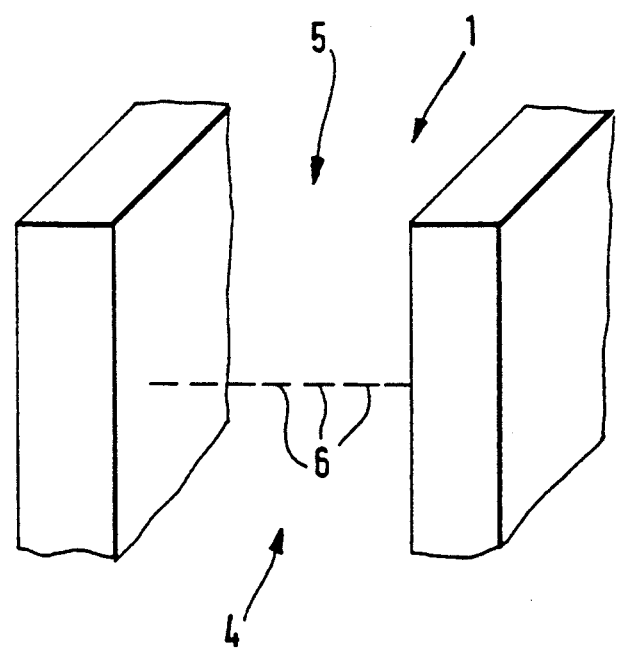
FIG. 2 shows a schematic representation as in FIG. 1, but when the liquid crystal display is controlled

If the liquid crystal display is now switched, i.e. if a control voltage is applied to it (and we shall subsequently come back to a brief discussion of this aspect), the liquid crystal molecules 6—as can be seen from FIG. 2—will assume a homoeotropic alignment, that is to say, there will no longer be any consequential co-rotation of the electric field vector. This means that the liquid crystal display becomes transparent: external light present on one side of the cell can now pass through and a display thus becomes possible. There is a certain deviation from the previously mentioned more or less parallel alignment of the liquid crystal molecules 6 with respect to the plane of one of the cover plates 2 or 3 inasmuch as—see FIG. 3—their longitudinal axis is set at a certain angle of attack $\delta$ with respect to the said plane of the cover plate 2 or 3. This angle of attack $\delta$ is also known as the pretilt angle. This angle of attack $\delta$ is a desired feature, because it stabilizes the helix of the liquid crystal molecules 6. Among others, this also makes it possible to realize comparatively large twist angles and, consequently, to construct liquid crystal displays (LCDs) that can be clearly read over large viewing angles.

The present invention concerns the determination of the angle of attack $\delta$ of liquid crystal molecules 6 in liquid crystal displays 1.

Figure 3:
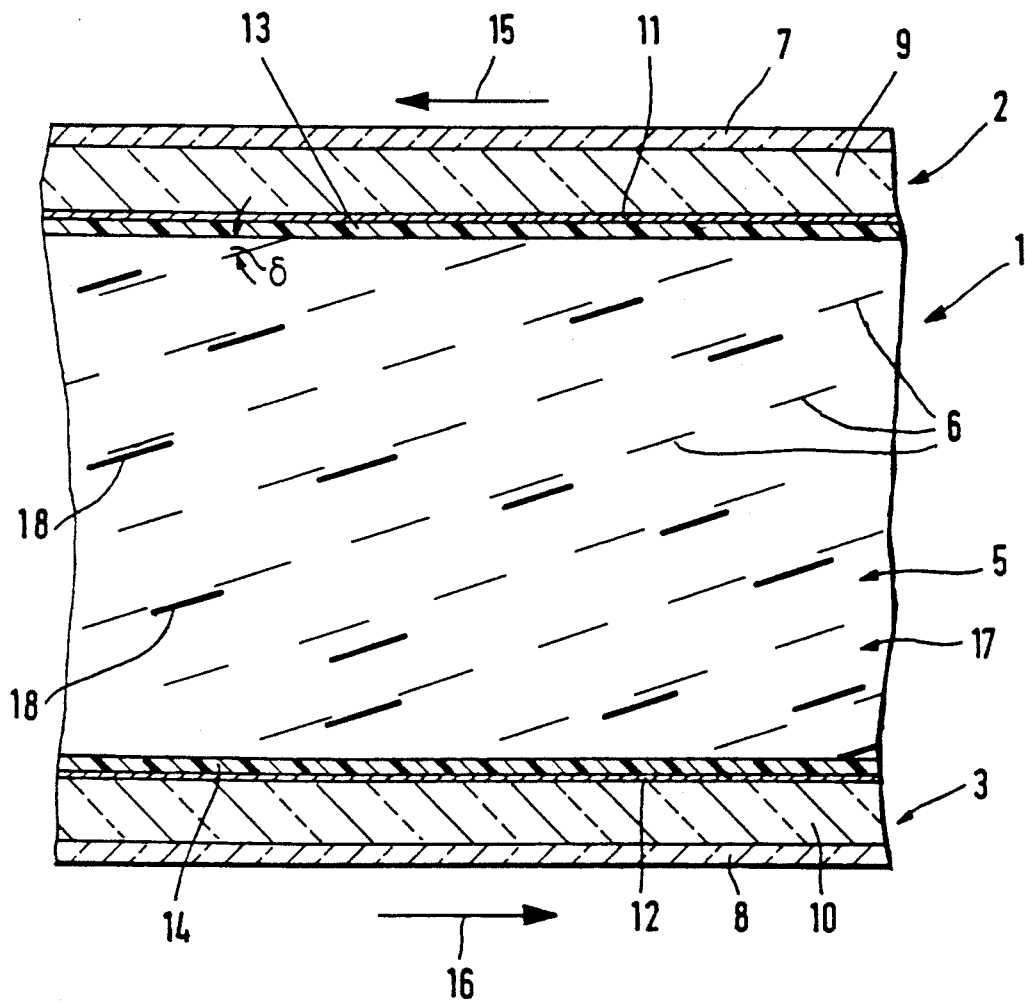
FIG. 3 shows a cross section through a part of a liquid crystal display with a twist of 0°.

Before discussing the method of determining the angle of attack $\delta$ in greater detail, the constructional features of the liquid crystal cell 1 should be further explained by reference to FIG. 3. The cover plates 2 and 3 are made up of different layers. Starting from the outside, in both cases there is a polarization filter 7 or 8. This is followed by a glass plate 9 or 10, this glass plate being provided with an electrode layer 11 or 12 on its inside. The layers 11, 12 are made in most cases of ITO (indium-tin oxide). They have a structure like the desired display that will subsequently become visible upon control. The thickness of these electrode layers is so small as to make them transparent. They are electrically conductive and are connected to electrical terminals (not shown in the figure), to which electrical control voltages are applied for the purposes of the display. The electrically conductive layer is followed in each case by an orientation layer 13 or 14. The orientation layers 13 and 14 consist of organic polymers, especially polyimides or polyphenyls; they confer an orientation (helix structure) upon the liquid crystal molecules. The orientation layers receive their property of impressing this orientation upon the liquid crystal molecules 6 as the result of rubbing step during the manufacture of the liquid crystal cell 1. For the purposes of carrying out the method of the present invention, however, a twist-free state of the liquid crystal molecules 6 is needed (twist angle $=0°$). To this end a roller is used to rub the orientation layers 13 and 14 in an antiparallel direction (see the arrows 15 and 16 in FIG. 3). One then obtains the arrangement of the liquid crystal molecules reproduced in FIG. 3.

When the angle of attack (pretilt angle) $\delta$ of the liquid crystal molecules 6 has to be determined, a dichroic dye 17 is added to the liquid crystal 5. The dye molecules 18, which are likewise more or less rod-shaped, tend to lean against the molecules 6 of the liquid crystal 5, so that they, too, will assume the preferred direction of the liquid crystal molecules 6 (FIG. 3). The dye molecules 16 will therefore have the same pretilt angle $\delta$ as the liquid crystal molecules 6.

Figure 4A:
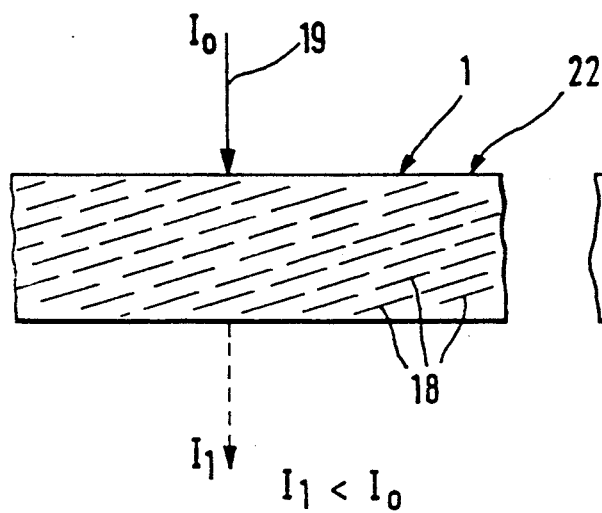
FIGS. 4a and 4b show, respectively, the liquid crystal display and the reference cell in the position in which they are arranged at the beginning of the absorption measurements
Figure 4B:
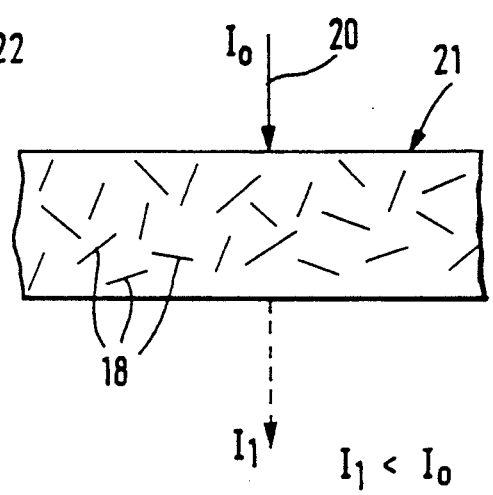

According to the present invention, the pretilt angle $\delta$ is determined by carrying out an absorption measurement (FIGS. 4a, 4b; 5a, 5b; 6). To this end a measuring ray 19 having the intensity $I_0$ is pointed at the liquid crystal cell 1 that has been doped by the addition of the dichroic dye 17 (see FIG. 4a). Furthermore, a reference cell 21, which has the same structure as the liquid crystal display 1 but is filled with an isotropic solution of the same dye 17 as the measuring cell 22. The term "measuring cell" is here to be understood as referring to the liquid crystal display 1. The isotropic solution has the property that the dye molecules of the reference cell 21 do not have any preferred alignment.

FIGS. 4a and 4b make it clear that the measuring ray 19 and the reference ray 20 are weakened due to the absorption (extinction) they suffer as they pass through, respectively, the measuring cell 22 and the reference cell 21, so that a new intensity $I_1$ becomes established, where $$I_1 < I_0.$$

At the commencement of the absorption measurements the measuring cell 22 and the reference cell 21 are aligned in such a way that the measuring ray 19 and the reference ray 20 will strike the cover plates 2 or 3 of the two cells at exactly a right angle. The quantity of the dye 17 added to the reference cell 21 is chosen in such a way that the absorption of both cells (i.e reference cell 21, measuring cell 22) will be exactly the same in this particular position.

Subsequently, both the measuring cell 22 and the reference cell 21 are turned—step by step—through the same angle of inclination with respect to their respective light rays (see FIGS. 5a and 5b) until the absorption measurement shows that an extreme value has been attained. The said extreme value is represented by the maximum relative absorption. "Relative" in this connection means that the measured results (intensity $I_2$ of the measuring cell 22 and intensity $I_3$ of the reference cell 21) are to be evaluated relative to each other by using the intensity $I_3$ of the reference ray 20 after it has passed through the reference cell 21 as the basis of comparison for the intensity $I_2$ of the measuring ray 21 after it has passed through the measuring cell 22. The said step-by step rotation of the two cells is thus continued until a position is reached in which the absorption of the measuring cell 22 relative to the absorption of the reference cell 21 becomes maximized. At this point one has $$I_2 < I_3 < I_1.$$

Figure 5A:
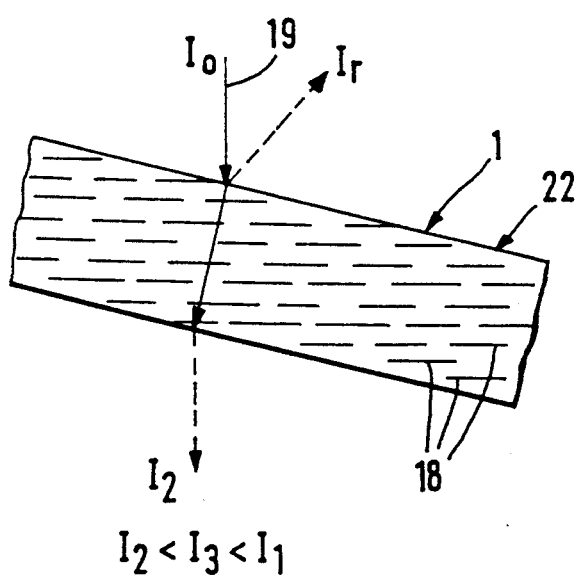
FIG. 5a and 5b show a representation as in FIGS. 4a and 4b, but with the two cells set at an angle of inclination with respect to their respective light rays
Figure 5B:
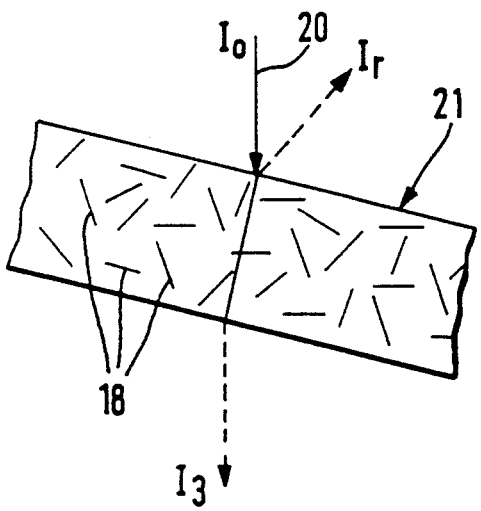

It can further be seen from FIGS. 5a and 5b that reflections (of intensity $I_r$) occur in the measuring cell 22 and the reference cell 21. Since—given the identical structure of the two cells—these reflections must be of the same magnitude, they do not have any effect on the (relative) measurement. The same may be said as regards the length of the angle-of-inclination-dependent light path through the measuring cell 22 and the reference cell 21. As the angle of inclination becomes greater, the light path lengthens in both cells, and this inevitably affects the light absorption. However, since the light paths are lengthened by the same amount in both cells, this phenomenon does not falsify the extreme value that is to be determined.

Figure 6:
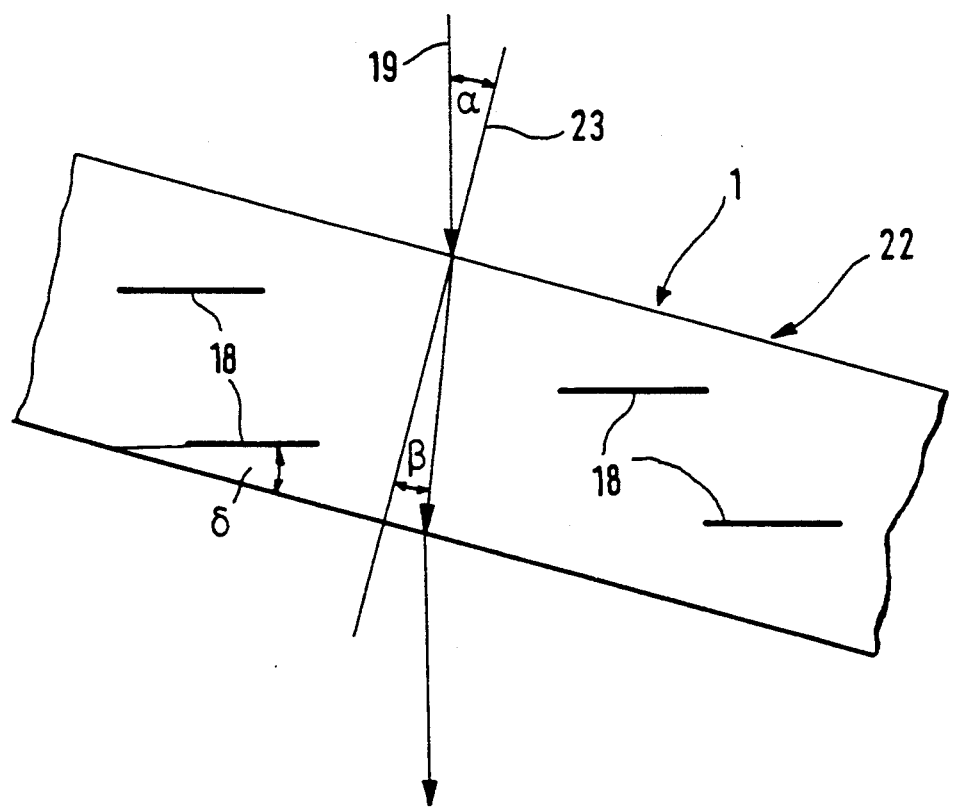
FIG. 6 shows a schematic representation of the light path through the liquid crystal display during the absorption measurements

When the angle of inclination associated with the maximum relative absorption of the measuring cell 22 has been found, it can be used for determining the pretilt angle δ. Referring to FIG. 6, it can be seen that the measuring ray 19 forms an angle α with respect to the normal 23 to the cell surface, i.e. the cover plate 2 or 3 of the measuring cell 22, at the point of incidence. Following refraction at this surface, the measuring ray inside the measuring cell will form an angle δ with respect to the said normal 23. The dye molecules 18, as already explained, form an angle of attack δ with respect to the plane of the cover plates 2 and 3. The angle of inclination, already mentioned several times above, is represented by the angle α.

The maximum absorption will occur when the measuring ray 19 strikes the dye molecules 18 exactly at a right angle with respect to their longitudinal axis. When this condition prevails, one has $$\delta = \beta.$$

Bearing in mind the law of refraction, it is therefore possible to establish a relationship between the angle β (and therefore the pretilt angle δ) and the angle of inclination α, so that the measurement of the angle of inclination δ enables one to calculate the pretilt angle δ. Taking the refractive index of air to be given by $n_{air} \approx 1$, one has (according to Snellius)

$$\frac{\sin \alpha}{\sin \beta} = n => \beta = \sin^{-1}\left(\frac{1}{n} \sin \alpha\right),$$

where n is the refractive index of the liquid crystal 5.

As the angle of inclination increases, the length of the light path inside the measuring cell 22 increases, but this is compensated by the reference cell 21 and does not therefore have any negative effects on the results of the measurement.

Alternatively, however, it is also possible to use a reference cell that does not contain any dye. In that case one has to take account of the greater length of the light path in the cell as the angle of inclination increases. The absorbed light intensity will then be given by $$I_{abs} \approx \frac{\sin^2 (90° + \delta - \beta)}{\cos \beta}.$$

Figure 7:
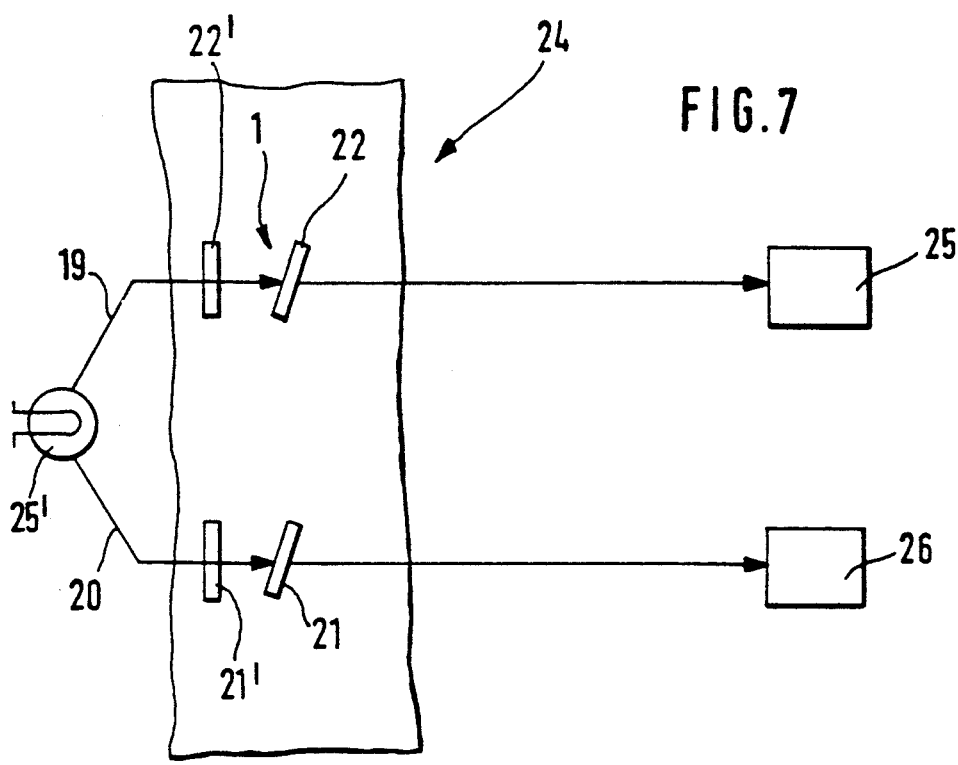
FIG. 7 shows a schematic representation of the complete experimental setup of the liquid crystal display and the reference cell for the absorption measurements.

FIG. 7 shows a schematic representation of a spectrometer 24 that can be used for carrying out the absorption measurement described above. A light source 25' supplies the necessary light for the measuring ray 19 and the reference ray 20. Both rays of light are deflected and made to pass through the polarization filters 21' and 22', the measuring cell 22 and the reference cell 21, eventually to strike the detectors 25 and 26, which determine the absorption in the respective cells. An appropriate evaluation circuit (not shown in the figure) can then be used to determine the maximum relative absorption.

Figure 8:
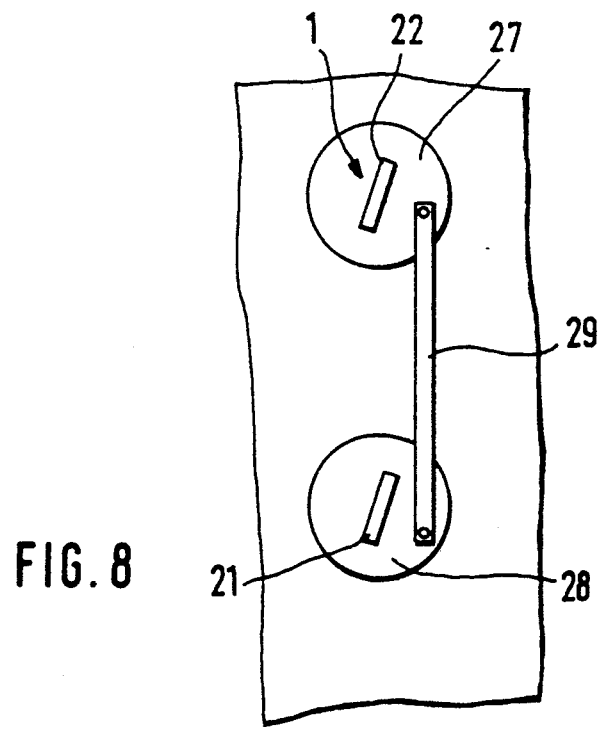
FIG. 8 shows the rotary table arrangement used to ensure that the liquid crystal display and the reference cell will always assume identical angular positions with respect to their respective light rays.

What has been said above makes it clear that the measuring cell 22 and the reference cell 21 must always be rotated in such a way as to assume the same angle of inclination α with respect to their respective light rays. FIG. 8 shows a device for this purpose, which comprises two rotary tables 27 and 28 to which the measuring cell 22 and the reference cell 21 can be fixed by means of appropriate holding means. The two rotary tables 27 and 28 are connected to each other by means of an excentrically fixed linkage rod 29, thus making sure that the two rotary tables 27 and 28 will always be rotated through the same angular amount. The polarization direction of the polarization filters 21' and 22' is in both cases perpendicular to the axis of rotation of the rotary tables 27 and 28. The orientation direction of the 0° twist cell also runs parallel to the associated axis of rotation.

In basic principle there is no need for carrying out the absorption measurements as relative measurements, i.e. there is no need to use a reference cell. The invention can therefore be realized also in the form of a simple absorption measurement on the measuring cell only, although this will involve measuring errors due to the changing length of the light path in the cell as the angle of inclination α changes and due to reflection phenomena. These errors could however be corrected, by calculation for example.

Taken as a whole, however, the method in accordance with the present invention makes it possible for the angle of attack (pretilt angle) δ of liquid crystal molecules 6 in liquid crystal displays (LCDs) to be determined in a simple and very cheap manner.

I claim:

1. A method of determining the angle of attack (pretilt angle) of the liquid crystal molecules of a liquid crystal display with both top and bottom cover plates, characterized by the following steps:
    addition of a dichroic dye (17) to the liquid crystal (5) in order to cause the dye molecules (6) to become aligned by the liquid crystal molecules, which are present in a twist-free state,
    determination by measurement of a maximum absorption value, the said measurement being carried out by causing a polarized ray of light (19) (measuring ray) to pass through the liquid crystal display (1) and varying its angle of inclination (α) with respect to the plane of the cover plates (2,3), and then
    using the angle of inclination (α) associated with the maximum absorption for determining the angle of attack δ.

2. A method in accordance with claim 1, characterized in that the twist-free state of the liquid crystal molecules (6) is brought about by antiparallel orientation of the two cover plates (2,3), especially of the orientation layers (13, 14) of the said cover plates (2,3).

3. A method in accordance with claim 1, characterized in that the orientation layers (13, 14) of the cover plates (2,3) are rubbed in an antiparallel direction to produce their orientation.

4. A method in accordance with claim 1, characterized in that the extreme value is found by determining the maximum absorption of the liquid crystal (5) to which the dye (17) has been added.

5. A method in accordance with claim 1, characterized in that the absorption measurement is carried out with an absorption spectrometer (24).

6. A method in accordance with claim 1, characterized in that the absorption measurements are carried out simultaneously on both the liquid crystal display (1) and on a reference cell (21), where the said reference cell (21) has the same structure as the liquid crystal display, is filled with an isotropic dye solution that has the same refractive index as the liquid crystal (5) of the liquid crystal display (1) to which the dye (17) has been added, the said reference cell being also passed by a reference ray of light (20) at the same angle of inclination ($\alpha$).

7. A method in accordance with claim 1, characterized in that the same dye (17) is used in the liquid crystal display (1) and the reference cell (21).

8. A method according to claim 1, characterized in that at the beginning of the absorption measurements the measuring ray (19) and the reference ray (20) are made to strike the cover plates (2,3) of the liquid crystal display (1) and the reference cell (21) at exactly a right angle and that the dye concentration in the reference cell (21) is set in such a manner that the absorptions in both cells (liquid crystal display 1, reference cell 21) come to be identical.

9. A method in accordance with claim 1, characterized in that when a dye-free reference cell (21) is used, the different length of the light path in the liquid crystal display (1) corresponding to the refraction angle ($\beta$) is taken into account by computation when determining the angle of attack $\delta$.

10. A method in accordance with claim 1, characterized in that the angle of inclination ($\alpha$) is varied by attaching both the liquid crystal display (1) and the reference cell (21) to appropriate rotary tables (27, 28) and that the said rotary tables (27, 28) are coupled to each other, thus ensuring that identical inclination angles ($\alpha$) will be set.

11. A method in accordance with claim 2 characterized in that the orientation layers (13, 14) of the cover plates (2, 3) are rubbed in an antiparallel direction to produce their orientation.

12. A method in accordance with claim 2, characterized in that the extreme value is found by determining the maximum absorption of the liquid cyrstal (5) to which the dye (17) has been added.

13. A method in accordance with claim 3, characterized in that the extreme value is found by determining the maximum absorption of the liquid cyrstal (5) to which the dye (17) has been added.

14. A method in accordance with claim 2, characterized in that the absorption measurement is carried out with an absorption spectrometer (24).

15. A method in accordance with claim 3, characterized in that the absorption measurement is carried out with an absorption spectrometer (24).

16. A method in accordance with claim 4, characterized in that the absorption measurement is carried out with an absorption spectrometer (24).

17. A method in accordance with claim 2, characterized in that the absorption measurements are carried out simultaneously on both the liquid crystal display (1) and on a reference cell (21), where the said reference cell (21) has the same structure as the liquid crystal display, is filled with an isotropic dye solution that has the same refractive index as the liquid crystal (5) of the liquid crystal display (1) to which the dye (17) has been added, the said reference cell being also passed by a reference ray of light (20) at the same angle of inclination ($\alpha$).

18. A method in accordance with a claim 3, characterized in that the absorption measurements are carried out simultaneously on both the liquid crystal display (1) and on a reference cell (21), where the said reference cell (21) has the same structure as the liquid crystal display, is filled with an isotropic dye solution that has the same refractive index as the liquid crystal (5) of the liquid crystal display (1) to which the dye (17) has been added, the said reference cell being also passed by a reference ray of light (20) at the same angle of inclination ($\alpha$).

19. A method in accordance with claim 5, characterized in that the absorption measurements are carried out simultaneously on both the liquid crystal display (1) and on a reference cell (21), where the said reference cell (21) has the same structure as the liquid crystal display, is filled with an isotropic dye solution that has the same refractive index as the liquid crystal (5) of the liquid crystal display (1) to which the dye (17) has been added, the said reference cell being also passed by a reference ray of light (20) at the same angle of inclination ($\alpha$).

20. A method in accordance with claim 5, characterized in that the absorption measurements are carried out simultaneously on both the liquid crystal display (1) and on a reference cell (21), where the said reference cell (21) has the same structure as the liquid crystal display, is filled with an isotropic dye solution that has the same refractive index as the liquid crystal (5) of the liquid crystal display (1) to which the dye (17) has been added, the said reference cell being also passed by a reference ray of light (20) at the same angle of inclination ($\alpha$).

* * * * *

UNITED STATES PATENT AND TRADEMARK OFFICE
CERTIFICATE OF CORRECTION

PATENT NO. : 5,172,187

DATED : December 15, 1992

INVENTOR(S) : Stefan Brosig

It is certified that error appears in the above-identified patent and that said Letters Patent is hereby corrected as shown below:

column 10, line 33, "5" should be --4--.

Signed and Sealed this

Twenty-sixth Day of October, 1993

*Attest:*

BRUCE LEHMAN

*Attesting Officer*   Commissioner of Patents and Trademarks